The specification in this patent is not in [illegible]
PATENTED JUNE 6, 1834.
8237X S. M. HANDY, J. ALBEE & E. B. CUTTS.
MILL FOR GRINDING CORN AND OTHER GRAIN.
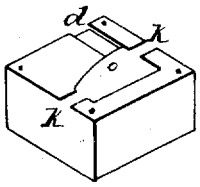
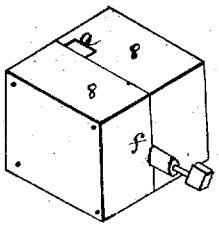
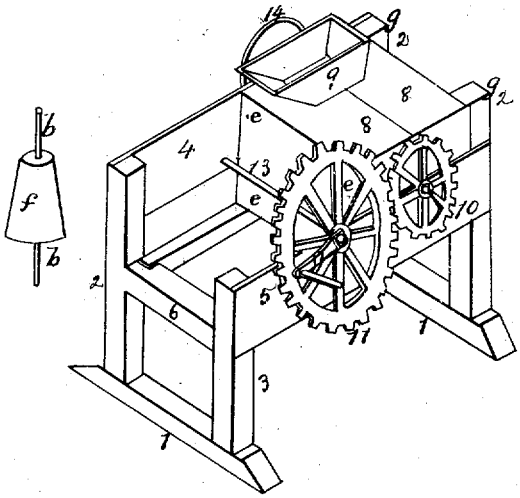
THE NORRIS PETERS CO., PHOTO-LITHO., WASHINGTON, D. C.

8237X  June 6. 1834  153.

Samuel M. Handy. John Albee & Enoch B. Cutts

Letters Patent  8237X

The Schedule referred to in these Letters Patent and making part of the same containing a description in the words of the said Samuel M. Handy John Albee & Enoch B. Cutts, themselves of their improvement in the mode of Constructing Mills for grinding Corn and other grain To all to whom [illegible] these presents shall come Be it known that we Samuel M. Handy, John Albee and Enoch B Cutts all of Hallowell in the County of Kennebec and State of Maine have invented a new and useful improvement in the mode of Constructing Mills for grinding corn and other grain and that the following is a full and exact description of the Construction and operation of the said Machine as invented & improved by us. The general appearance of the Machine is represented in the accompanying drawings. A frame is first built No 1 represents the sills which are about two and a half feet long. No 1,2,2,2, 3 represent four posts which are fastened to the sills by tenons which are made at the foot of the posts entering Mortices corresponding in the sills.

No. 2,2,2. are three and three fourths feet high more or less and No 3. 3 feet high. No 4 is a plank one foot in width which is spiked on to two of the posts on the back side of the Machine No 5 is a plank of the same size spiked on to the front posts. No 6 is a bar with a tenon on either end which enters a Mortice in the side of the post about two and one half feet from the foot of the post, and is about two feet long. A similar bar connects the two posts of the frame at the other end No 7 is a bar which lies upon the two before mentioned bars A similar bar is placed upon the same cross bars at the other end of them. These bars support the mill stones No 1.8.8).

The Stones nos. 8.8. are about twenty two inches across upon the top, and nineteen inches deep, and are of an equal size. That is to say the distance across the tops of both of the stones, is twenty two inches more or less. No 9 is the hopper into which the corn or grain is put. No 10 is a small cog wheel. about Eleven inches in diameter which plays upon a shaft [illegible]

which passes through in the middle between the two Stones 88, which cog Wheel
is turned by another large cog wheel No 11 about 3 feet in diameter. The Wheel No 11
plays upon a Shaft No 13 and is turned by a crank No 12. Both of the Shafts
rest one end upon the top side of the plank No 5 and the other end passes through
the plank No 4. No 14 is a balance wheel about 3 feet in diameter which is
attached to one end of the Shaft L. L is a Shaft which passes through a cyl-
-indrical Stone f. f is a Cylindrical Stone about sixteen inches long and four-
-teen inches in diameter at the large end and twelve inches in diameter at the
other which plays into a Cavity exactly fitted to receive said Stone.
One half of this Cavity [illegible] each of the
Stones 88. Corresponds one side of this Cavity and k.k one side of the box in which
the Shaft L plays. A Cavity exactly similar is made in the other Stone 8.
A represents the orifice through which the
Corn is Carried to the revolving Stone f. & is an orifice which lets the meal
out made in the opposite end and side of the Stone from where a is situated.
What we claim as new and of our own in-
vention is the peculiar form of the Stones and the particular application of
said Stones and their arrangement as above specified and described Witness
[illegible] John Otis
I Young Seaman Samuel M Handy
John Albee
Enoch B Cutts Drawing

864